United States Patent [19]

Ross

[11] Patent Number: 5,751,073
[45] Date of Patent: May 12, 1998

[54] VEHICLE PASSIVE KEYLESS ENTRY AND PASSIVE ENGINE STARTING SYSTEM

[75] Inventor: Christian Eric Ross, Freeland, Mich.

[73] Assignee: General Motors Corporation, Detroit, Mich.

[21] Appl. No.: 755,327

[22] Filed: Nov. 20, 1996

[51] Int. Cl.$^6$ .................................................. B60R 25/04
[52] U.S. Cl. .................... 307/10.5; 180/287; 340/825.69; 290/38 C; 123/179.2
[58] Field of Search .......................... 307/9.1–10.6; 123/179.1–179.3; 290/38 C, 38 E; 180/287; 340/425.5, 426, 825.3–825.32, 825.34, 825.44, 825.54, 825.69, 825.72

[56] References Cited

U.S. PATENT DOCUMENTS

| | | |
|---|---|---|
| 3,455,403 | 7/1969 | Hawthorne . |
| 3,577,164 | 5/1971 | ReBaratelli et al. . |
| 4,143,368 | 3/1979 | Route et al. ............. 340/543 |
| 4,227,588 | 10/1980 | Biancardi ................ 180/167 |
| 4,236,594 | 12/1980 | Ramsperger ............ 180/167 |
| 4,345,554 | 8/1982 | Hildreth et al. . |
| 4,392,059 | 7/1983 | Nespor .................... 290/38 D |
| 4,606,307 | 8/1986 | Cook . |
| 4,674,454 | 6/1987 | Phairr . |
| 4,688,036 | 8/1987 | Hirano et al. ........... 340/825.69 |
| 4,719,460 | 1/1988 | Takeuchi et al. ....... 340/825.31 |
| 4,763,121 | 8/1988 | Tomoda et al. ......... 340/825.54 |
| 4,901,690 | 2/1990 | Cummins et al. ....... 123/179 B |
| 4,942,393 | 7/1990 | Waraksa et al. ........ 340/825.72 |
| 4,973,958 | 11/1990 | Hirano et al. ........... 340/825.69 |
| 5,000,139 | 3/1991 | Wong . |
| 5,129,376 | 7/1992 | Parmley .................. 123/179.2 |
| 5,157,389 | 10/1992 | Kurozu et al. .......... 340/825.31 |
| 5,293,160 | 3/1994 | Kurozu et al. .......... 340/825.32 |
| 5,319,364 | 6/1994 | Waraksa et al. ........ 340/825.72 |
| 5,349,931 | 9/1994 | Gottlieb et al. ......... 123/179.2 |
| 5,454,238 | 10/1995 | Ross et al. .............. 70/186 |
| 5,596,234 | 1/1997 | Umeda et al. .......... 307/10.2 |

*Primary Examiner*—Richard T. Elms
*Attorney, Agent, or Firm*—Robert M. Sigler

[57] ABSTRACT

A motor vehicle has a detector for detecting the presence of a valid radio frequency transmitter only within a seating space inside the vehicle. Start control circuitry is responsive to a RUN signal, provided that the detector has detected the presence of a valid radio frequency transmitter within the seating space, to unlock a steering column lock, activate an engine electric power circuit and a start motor, repeatedly receive an engine speed signal from the engine speed signal generator and compare the received engine speed signal to a predetermined speed reference indicating engine starting. The start motor is deactivated and a park lock solenoid is activated when the engine speed signal exceeds the speed reference. Alternatively, the engine electric power circuit and start motor are deactivated and the column lock is locked if the engine speed signal does not exceed the speed reference within a first predetermined time. Engine deactivation occurs responsive to an OFF signal during engine operation to deactivate the engine electric power circuit and activate the detector; and an accessory control is responsive to engine deactivation, if a valid transmitter is detected, to activate the accessory circuit for a predetermined time or until the driver door is opened, whichever occurs first, and suspend activation of the detector for the duration of the activation of the accessory circuit. A vehicle access control may be responsive to the same transmitter by way of a first antenna mounted on the vehicle body for communication with the transmitter outside the body while the detector has a second antenna associated with the driver seat for communication with the transmitter only within the seating space.

8 Claims, 9 Drawing Sheets

5,751,073

VEHICLE PASSIVE KEYLESS ENTRY AND PASSIVE ENGINE STARTING SYSTEM

TECHNICAL FIELD

The technical field of this invention is the control of motor vehicles and particularly the security of control of motor vehicle operation.

BACKGROUND OF THE INVENTION

The ability of an individual to operate a motor vehicle generally depends on that individual possessing a key which is mechanically cut in a predetermined pattern to activate the tumblers of an ignition lock apparatus to allow rotation of the lock cylinder from a locked position to one or more unlocked, operating positions. In the locked position, the engine and accessory related electrical circuits are disconnected from the vehicle electric power supply; and various safety and/or security related elements, such as a steering column lock and park lock solenoid, for example, are locked to prevent vehicle movement. In fact, United States motor vehicle regulations require most passenger vehicles to be manufactured including a key locking system which, when the key is removed, prevents normal activation of the vehicle engine and either steering or self-mobility of the vehicle.

Motor vehicles are also provided with door locks which are also unlocked by a key to provide vehicle access. Generally, this key has been a different key from that unlocking the ignition lock to allow vehicle operation; but in recent years there has been some movement toward a single key fitting both locks. In addition, so called "keyless entry" access systems are growing in popularity. In these systems, a numerical access code is stored in a transmitter and transmitted by electromagnetic signals to a receiver in the vehicle which extracts and validates the code with reference to its own stored information and unlocks the vehicle door locks for vehicle access without the use of the mechanical key, although the latter is also usually provided for choice or backup. Some of these systems require operator activation of an unlocking switch on the transmitter; but others are passive, in the sense that they require no operator switch activation but operate automatically when carried within close range of the vehicle. Some examples of these systems are shown in U.S. Pat. No. 5,319,364 to Waraksa et al, No. 5,157,389 to Kurozu et al, No. 4,973,958 to Hirano et al, No. 4,942,393 to Waraksa et al, No. 4,763,121 to Tomoda et al, No. 4,719,460 to Takeuchi et al, and No. 4,688,036 to Hirano et al.

In most keyless entry vehicles, once the operator gains access to the vehicle by a keyless entry transmitter, vehicle operation still requires use of a key, usually mechanical. However, a few such systems use the same key for enabling of vehicle engine operation. U.S. Pat. Nos. 5,157,389, 4,973,958 and 4,719,460 cited above, for example, provide some references to vehicle ignition or starter enabling in response to an RF keyless entry. In addition, U.S. Pat. No. 4,143,368 to Route et al suggests that a coded infrared transmitter used for door unlocking in vehicle access might be placed in a receptacle in the vehicle as a substitute for an ignition key for unlocking the vehicle ignition and allowing engine starting and vehicle operation. However, none of these references provides any complete description of a system for so doing.

Given the popularity of these keyless entry systems for vehicles and the growing acceptance of a single key for vehicle access and operation, it would appear that there would be a market for a system which provided for vehicle operation by a coded transmitter, preferably the same used for vehicle access, with a simple, "push-button" start. Preferably, such a system would act in a passive manner, so that a vehicle operator would only have to approach the vehicle with a transmitter in a pocket or handbag, open the door which had unlocked automatically during the approach, enter the vehicle, activate a push-button or similar "keyless" start switch to activate an engine electric power circuit with an electronic lock which is unlocked automatically with the transmitter in the vehicle, and wait for several seconds as the system automatically started the engine, all without ever touching the transmitter. Even if vehicle entry or start were actively initiated, however, the starting of the engine would be automatically controlled and vehicle access and control would be automatically taken care of without a need for a standard ignition key.

Of less popularity, but certainly known in the art, are remote vehicle starting systems. These systems allow a vehicle owner or operator to start the engine of a vehicle and warm it up from a remote location before directly accessing the vehicle for entry. Examples of such systems are shown in the U.S. Pat. No. 5,349,931 to Gottlieb et al, No. 5,129,376 to Parmley, No. 5,000,139 to Wong, No. 4,901,690 to Cummins et al, No. 4,674, 454 to Phairr, No. 4,606,307 to Cook, No. 4,392,059 to Nespor, No. 4,345,554 to Hildreth et al, No. 4,236,594 to Ramsperger, No. 4,227,588 to Biancardi, No. 3,577,164 to Baratelli and No. 3,455,403 to Hawthorne. However, these systems do not appear to provide normal vehicle operation capabilities. Since they are designed for use when the legitimate operator of the vehicle is not physically present at or in the vehicle, limitation of allowed vehicle operational functions is important for vehicle security. They are confined to stationary vehicle warm-up; and the operator still must use a key in the usual ignition lock to have full operational use of the vehicle.

SUMMARY OF THE INVENTION

The invention is a motor vehicle comprising an engine, an electric engine power circuit, a start motor, and a vehicle body having a seating space therein associated with a driver seat. Detector means are provided for detecting the presence of a valid radio frequency transmitter only within the seating space by receiving a coded radio frequency signal therefrom, deriving a code from the radio frequency signal and validating the derived code in a predetermined validation process. The vehicle further comprises a RUN signal generator, a steering column lock, an engine speed signal generator and start control means responsive to activation of the RUN signal generator, provided that the detector means has detected the presence of a valid radio frequency transmitter within the seating space, to unlock the steering column lock, activate the engine electric power circuit and the start motor, repeatedly receive an engine speed signal from the engine speed signal generator and compare the received engine speed signal to a predetermined speed reference indicating engine starting. The start means deactivates the start motor when the engine speed signal exceeds the speed reference or, alternatively, deactivates the engine electric power circuit and the start motor and locks the column lock if the engine speed signal does not exceed the speed reference within a first predetermined time. Since the detector means are responsive to the transmitter only within the seating space and thus within the vehicle body, control of vehicle operation is more secure, especially for a system in which the transmitter is a passive transponder. Since the vehicle takes complete control of the vehicle starting process after generation of a RUN signal, it can be securely started with minimal driver involvement, which is also especially useful in a passive transponder system.

The vehicle of the invention preferably further comprises an accessory circuit, a driver door, an OFF signal generator, engine deactivation means responsive to activation of the OFF signal generating means during engine operation to deactivate the engine electric power circuit and activate the detector means, and accessory control means responsive to the engine deactivation means, if a valid transmitter is detected, to activate the accessory circuit for a predetermined time or until the driver door is opened, whichever occurs first, and suspend activation of the detector means for the duration of the activation of the accessory circuit. Thus, the vehicle may securely provide retained accessory power for a limited time after the engine is shut off.

The vehicle preferably further comprises a vehicle driveline component such as an automatic transmission having a condition wherein vehicle self-mobility is enabled and a condition such as PARK wherein vehicle self-mobility is not enabled, means for ending accessory circuit activation, lock determination means responsive to the means for ending accessory circuit activation and the vehicle driveline component for activating a key alarm if vehicle mobility is enabled and repeatedly activating the detector means while vehicle mobility is not enabled, and means responsive to the lock determination means, when a valid transmitter is not detected in the vehicle seating space, to lock the column lock and prevent further activation of the electric engine power circuit and the accessory circuit. Thus, when engine and accessory activation is ended, provided the vehicle is not capable of self-mobility, the detector is repeatedly activated to determine when the transmitter leaves the seating space and, when this occurs, locks the column lock and prevents reactivation of the engine and/or accessory. If the vehicle is capable of self-mobility, a key alarm is alternatively activated.

The vehicle may have a driver door and a vehicle access control effective to detect the transmitter outside the vehicle body and provide vehicle access by receiving a coded radio frequency signal therefrom, deriving a code from the radio frequency signal, validating the derived code in a predetermined validation process and unlocking the driver door. If so, the vehicle access control has a first antenna mounted on the vehicle body for communication with the transmitter outside the body; and the detector means has a second antenna associated with the driver seat, preferably under it, for communication with the transmitter only within the seating space. Thus, the vehicle of the invention may use a single transmitter for both secure vehicle operation and secure vehicle access by providing separate antennas, with the antenna for vehicle access capable of transmitter communication outside the vehicle and the antenna for secure vehicle operation capable of transmitter communication only within the seating space inside the vehicle body.

Preferably, the automatic transmission has park lock solenoid means effective when deactivated to prevent shifting out of the PARK mode and when activated to allow shifting out of the PARK mode; and the park lock solenoid means is also activated when the engine speed signal exceeds the speed reference and deactivated along with the engine electric power circuit.

The vehicle of the invention preferably stores a code datum in memory when the detector means detects the presence of a valid radio frequency transmitter within the seating space. The code datum is a key enabling activation of the engine electric power circuit and an accessory circuit activated when the engine speed signal exceeds the speed reference. The vehicle further comprises means for deactivating the engine electric power circuit and the accessory circuit and repeatedly activating the detector means while retaining the code datum in the memory, the means further being responsive to the detector means, when a valid radio frequency transmitter is no longer detected within the seating space and a vehicle driveline component is in a condition wherein vehicle self-mobility is not enabled, to remove the code datum from the memory and thus prevent activation of the engine electric power circuit and the accessory circuit.

DESCRIPTION OF THE PREFERRED EMBODIMENT

Figure 1:
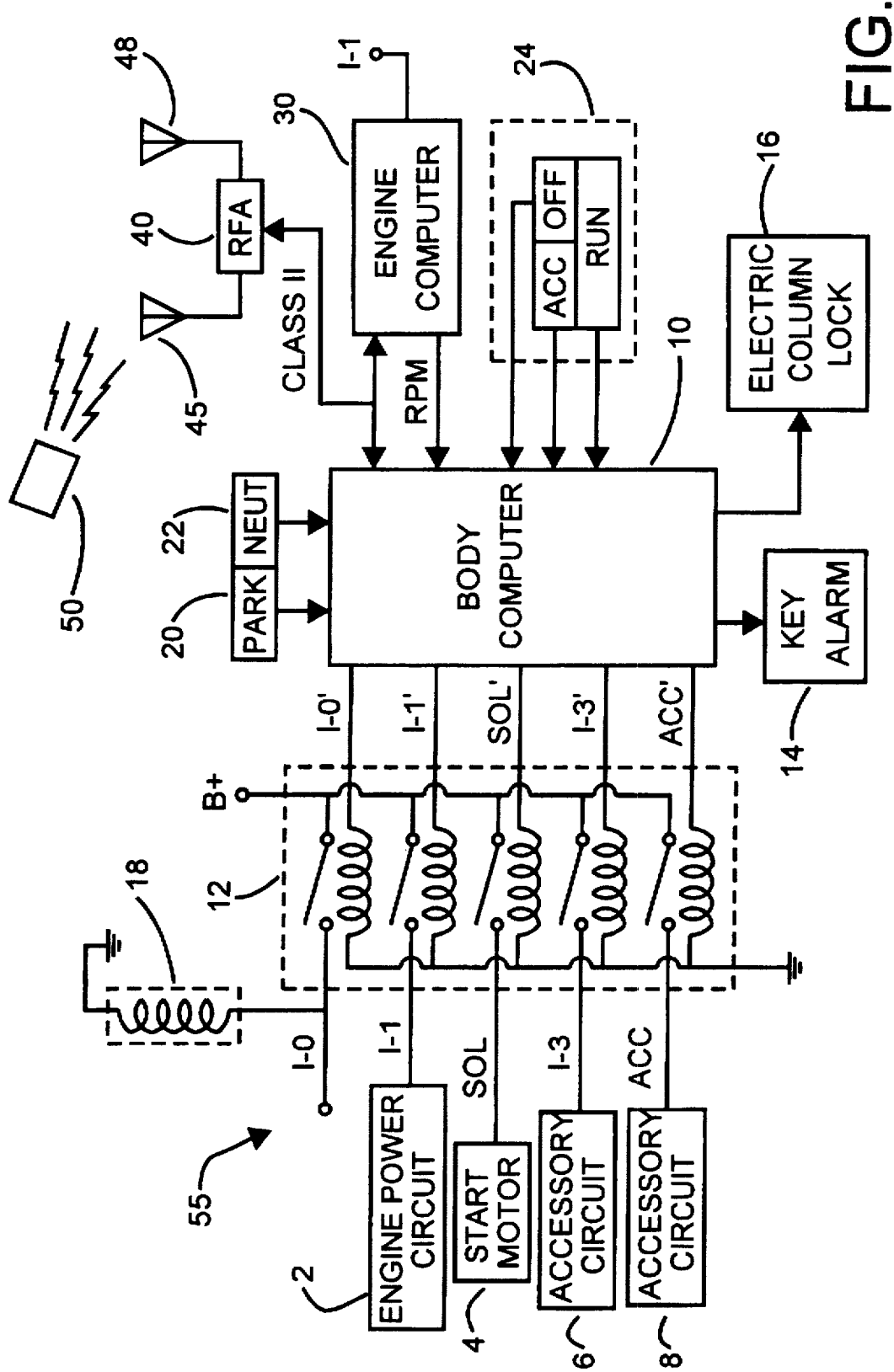
FIG. 1 is a block diagram of a motor vehicle with an operation control according to the invention.

FIG. 1 shows a block and circuit diagram of an operation control for a vehicle having a body 55. A body computer 10 is provided with outputs I-0', I-1', SOL', I-3' and ACC', each of which is connected through a relay of a relay center 12 to independently connect or disconnect a similarly named output line (I-0, I-1, SOL, I-3 and ACC) and a source of DC electric power B+. These output lines provide electric power to different circuits of the vehicle. Line I-0 is used for park lock solenoid 18 and the PRNDL (automatic transmission indicator) system, not shown; line I-1 is used for an engine electric power circuit 2, as well as the fuel injection circuit, not shown, and engine computer 30; terminal I-3 is used for accessory circuits 6 such as HVAC (heater, ventilator and air conditioning) and power windows; terminal ACC is used for an accessory circuit 8 powering the radio; and terminal SOL is used for the start motor 4, which includes a start solenoid.

Body computer 10 further controls a key alarm 14 and an electric steering column lock 16. Key alarm 14 is an alarm, preferably audible, which is activated when the driver door is opened with the ignition key present in the ignition system, in a position wherein the vehicle may be started and operated. In vehicles of the prior art, such a condition is a familiar mechanical key left "in the ignition." In this system, which needs no mechanical key, the presence of a key "in the ignition" may be defined somewhat differently, as will be explained later in this description. The electric column lock 16 is an electrically activated device which, when locked, prevents the steering column from turning and thus effectively prevents the vehicle from being driven any significant distance. It may of the type described in U.S. Pat. No. 5,454,238, Anti-Theft Apparatus for Motor Vehicle Steering Column, issued Oct. 3, 1995. The park lock solenoid 18 must be activated to move an automatic transmission lever out of PARK to put the vehicle in a condition of self-mobility.

Body computer receives inputs from a park switch 20, a neutral (NEUT) switch 22, and a control input module 24 having operation control switches RUN, OFF and ACC, which may be activated by labeled push buttons on the steering column or dashboard of the vehicle. These switches comprise RUN, OFF and ACC signal generators, respectively. The park and neutral switches are part of vehicle driveline component, such as an automatic transmission, which controls vehicle self-mobility; and each switch indicates when an automatic transmission is in the corresponding condition. The operation control switches for RUN, OFF and ACC replace the rotationally chosen switches in the key operated ignition cylinder of a prior art vehicle in providing operator activation and deactivation of electric power for engine and accessories. Body computer 10 further receives an engine speed signal RPM from an engine computer 30 including an engine speed signal generator and is connected via a class II communication bus to engine computer 30 and a remote function activation (RFA) module 40.

RFA module 40 may be part of a passive vehicle access control in which a portable transmitter 50, which may be a transponder, is detected and interrogated by the RFA module, as it is carried up to the vehicle, through an antenna 45 comprising a multi-turn, looped wire which may be mounted vertically in the door of a vehicle having a door with a non-metallic outer skin. RFA module 40 determines the validity of an identification code stored in a memory within transmitter 50 according to any known validation process, but preferably through a public key encryption algorithm. If a valid code is determined, the RFA module unlocks the vehicle driver door to provide entry to the vehicle. The RFA module and transmitter may be of the type described in the U.S. Pat. No. 4,942,393 to Waraksa et al, issued Jul. 17, 1990.

Figure 2A:
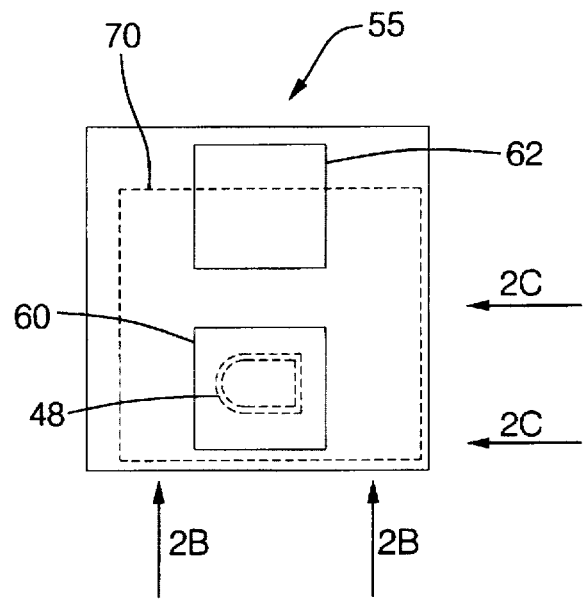
FIG. 2A, 2B and 2C illustrate the placement and coverage area of an antenna for detecting a radio frequency transmitter in the seating space of a driver seat for use in the vehicle of FIG. 1.
Figures 2B, 2C:
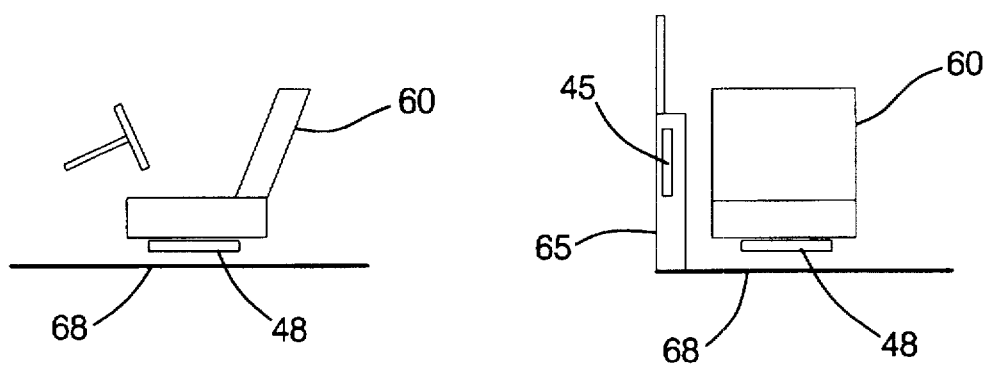

The system of this invention, however, adds a second antenna 48, which may be similar to antenna 45 in form but is located within the vehicle, in a horizontally aligned position under the driver seat 60. The positioning and coverage of antenna 48 are visually indicated in FIG. 2A-2C. FIG. 2B shows a side view of a driver seat 60 having antenna 48 disposed in a horizontal configuration beneath it. FIG. 2C shows a back view of the same seat 60 and antenna 48 and, for reference, also shows the driver door 65 with antenna 45 vertically disposed therein. Antenna 48 is positioned and directed to detect signals from a radio frequency transmitter in a seating space defined by the space above and near driver seat 60 in which a transmitter carried by a vehicle driver would be located. This space is generally shown in FIG. 2A, which shows a view looking down from above on the relevant passenger space of vehicle body 55, with the front of the vehicle to the left. Driver seat 60 is shown with antenna 48 below it indicated by broken lines. Passenger seat 62 is shown above driver seat 60 in the figure but to the right of driver seat 60 from the perspective of the vehicle. The coverage area of antenna 48 is shown horizontally by broken line 70. This coverage area is a seating space which includes the driver seat itself as well as some space behind the driver seat back and at least part of the front passenger seat. Vertically, this seating space extends upward through the space normally occupied by passengers and downward to the vehicle floor 68, shown in FIG. 2B and 2C. Thus, RFA module with antenna 48 will detect a radio frequency transmitter carried by the vehicle operator in a clothing pocket when the operator is entering or seated in the vehicle driver seat and will further detect such a transmitter in a handbag or briefcase placed close to the driver seat, e.g. on part of the front passenger seat or on the floor directly behind the driver seat. However, antenna 48, along with its processing circuitry in RFA module 40, is designed with limited sensitivity so that it will not respond to radio frequency transmitters located outside the seating space as defined above, and particularly outside the vehicle. This is facilitated by the steel floor 68 of the vehicle chassis underneath antenna 48 and, for vehicles with a steel skin, the rest of the vehicle body itself.

Figure 3:
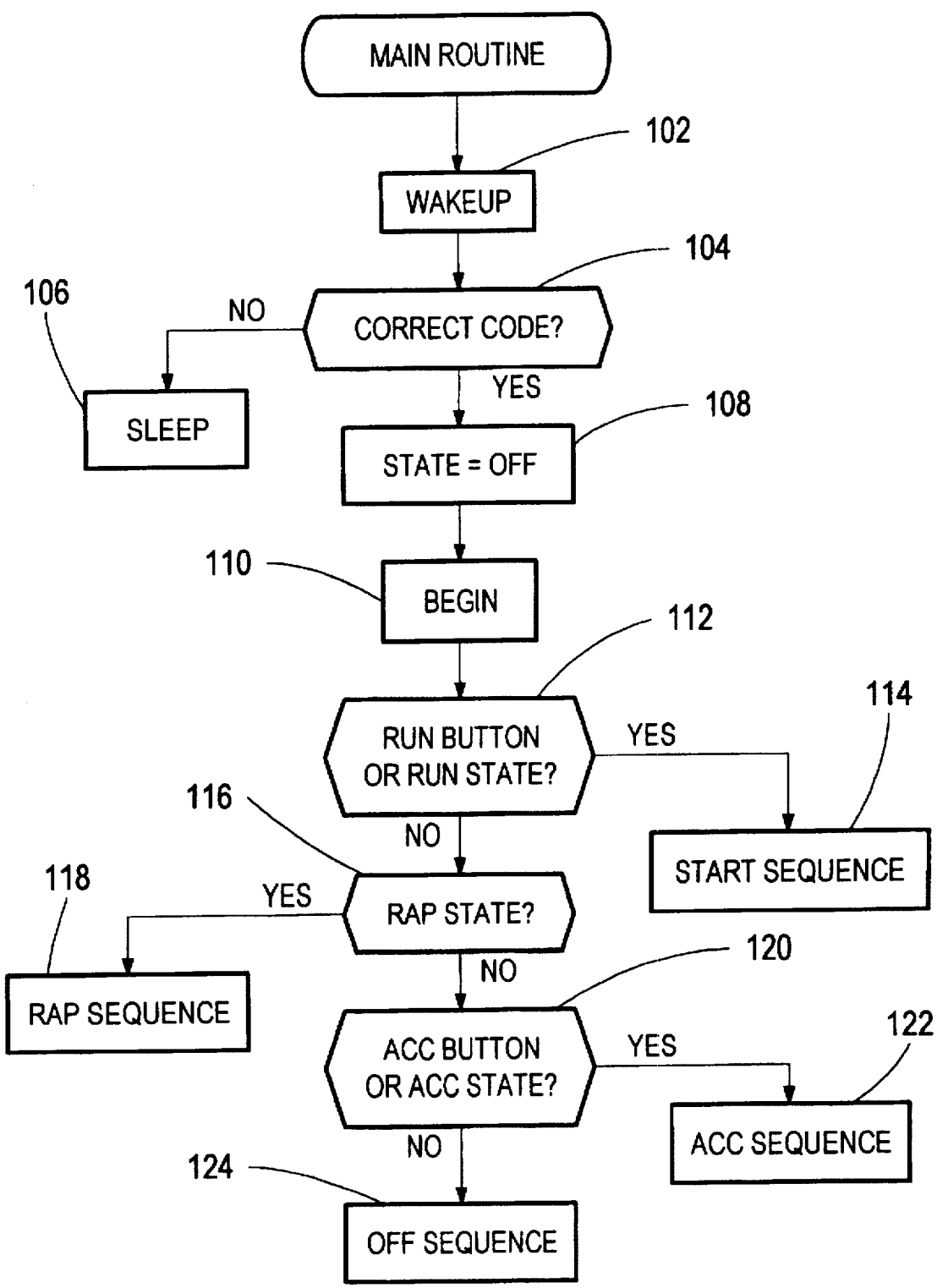
FIG. 3, 4A, 4B, 5, 6A, 6B and 7 are flow charts illustrating the operation of the operation control for the vehicle of FIG. 1.

Upon entry into the vehicle by a driver holding or carrying transmitter 50, the transmitter is sensed by the RFA through antenna 48. When this occurs, RFA module 40 again interrogates transmitter 50 for a valid code; and, if a valid code is detected, RFA module provides a signal on the Class II bus to body computer 10. This initiates the MAIN ROUTINE of body computer 10 with a wake-up at step 102 of the flow chart of FIG. 3. Since the Class II bus is a general purpose communication bus and body computer 10 may have additional functional routines, RFA module 40 provides an internally generated code to body computer 10 to indicate that a valid transmitter is within the seating space of the vehicle; and body computer 10 receives the code and compares it with one or more internal codes at 104. If no match is detected, body computer 10 goes back to sleep at 106. However, if a correct code is confirmed, the system sets its state as the OFF state at 108 and continues to BEGIN 110, a point reached from wake-up as described above and also as a return point from other parts of the program.

Body computer 10 also responds to the activation of the RUN, OFF or ACC switches in control input module 24. For example, activation of any of these switches may initiate an interrupt routine which sets a flag of the chosen switch. Thus, from BEGIN, the program always checks for a switch activation or other change of operational state and routes the program to the subroutine appropriate for the detected switch or state. The first check is for a RUN state at 112. If the RUN switch was pressed or the RUN state is selected, the START sequence is called at 114. Next, a RAP (Retain Accessory Power) state is checked at 116. There is no operator selectable switch for the RAP state; it is a system determined state in which accessory power is retained for some time after the OFF switch is activated to end normal engine operation. If the RAP state is selected, the system calls the RAP sequence at 118. Next, an ACC (Accessory) state is checked at 120. If the ACC button was pressed or the ACC state is selected, the system calls the ACC sequence at 122. If the routine reaches step 124, the OFF sequence is called.

Figure 4A:
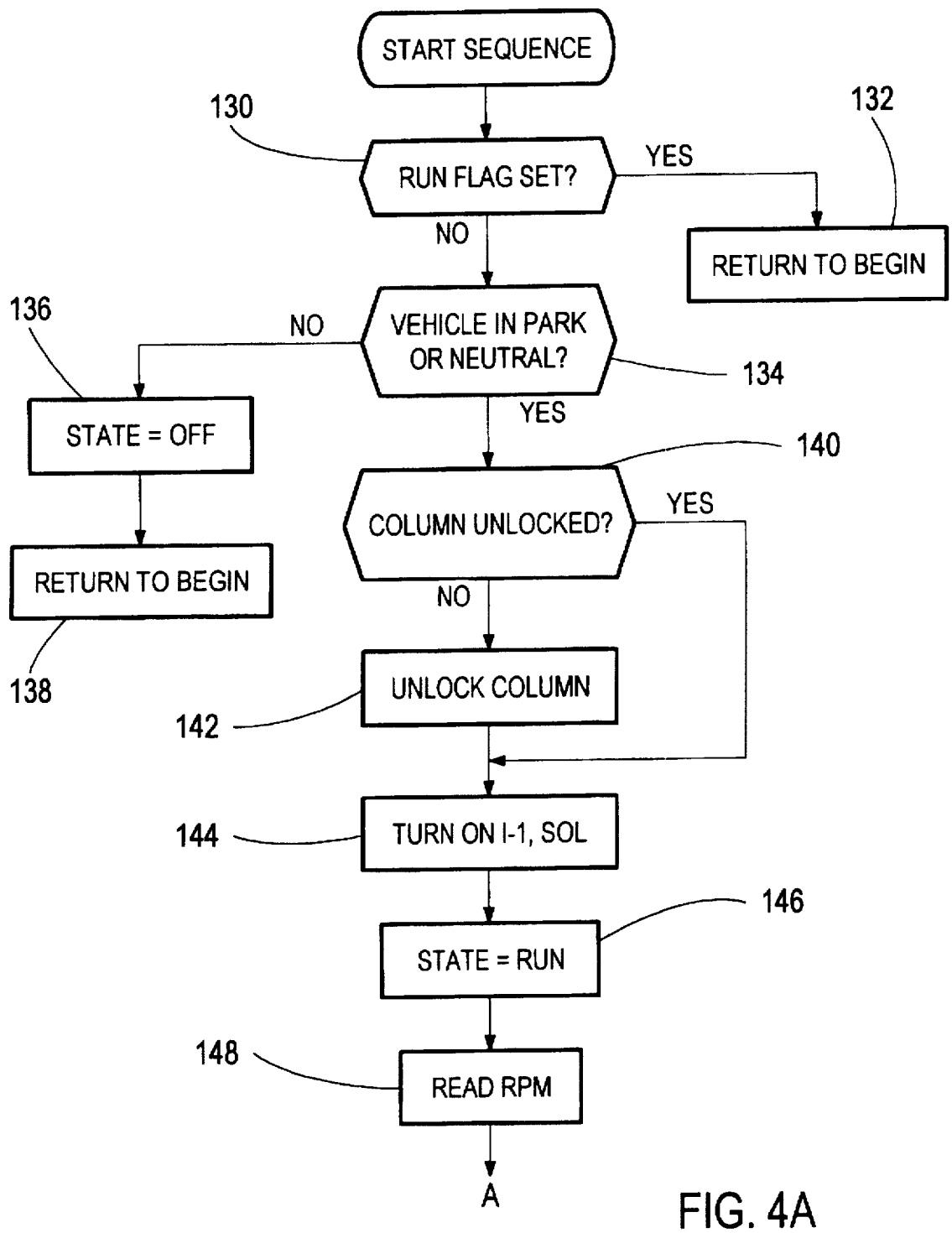
Figure 4B:
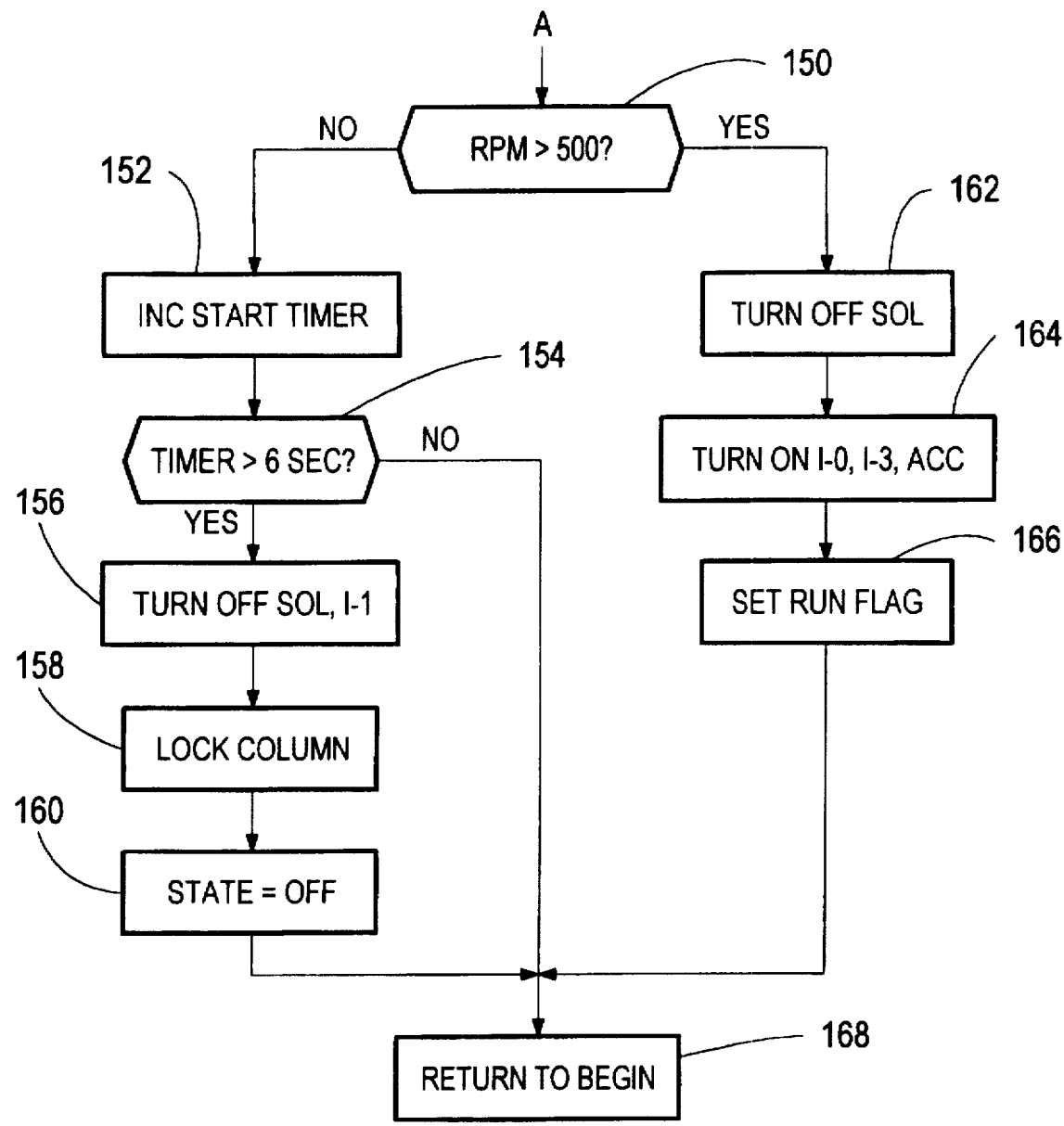

FIG. 4A and 4B show the START sequence or subroutine in flow chart form. Since the main function of this sequence is the control of engine starting, a RUN flag is first checked at 130 of FIG. 4A. If it is set, the vehicle engine has been started and there is no need for the RUN sequence; therefore, the system proceeds directly to step 132, from which it returns to BEGIN. If the RUN flag is not set, the system checks the state of the park and neutral switches (20, 22) to determine if the vehicle transmission is in PARK or NEUTRAL at 134. If not, engine starting is not permitted; and the system selects the OFF state at 136 and returns to BEGIN from 138. If the transmission is found to be in PARK or NEUTRAL at 134, the system checks at 140 to see if the ECL (Electric Column Lock) is unlocked. If not, the system calls an UNLOCK COLUMN subroutine 142. If so, however, this subroutine is skipped. The system next outputs signals at 144 to turn on circuits I-1 and SOL. The former provides power to the vehicle ignition system, engine computer and fuel injection system for engine operation; and the latter provides power to the vehicle start solenoid and start motor to start engine cranking. The RUN state is selected at 146; and the vehicle engine speed signal RPM from engine computer 30 is read at 148.

Continuing with reference to FIG. 4B, the RPM signal is compared at 150 with a predetermined value indicative of engine start (e.g., 500 RPM); and, if it is less, a START TIMER is incremented at 152; and the timer value is checked at 154. If the timer value is greater than a predetermined value, such as 6 seconds, indicating start failure, circuits I-1 and SOL are turned off at 156, the ECL is locked at 158 and the OFF state is selected at 160 before the system proceeds to step 168 for return to BEGIN. If the timer has not yet timed out at 154, the system proceeds directly to step 168. If the RPM signal indicates engine start at step 150, the system turns off circuit SOL at 162, turns on circuits I-0, I-3 and ACC at 164 and sets the RUN flag at 166 before proceeding to step 168.

Figure 5:
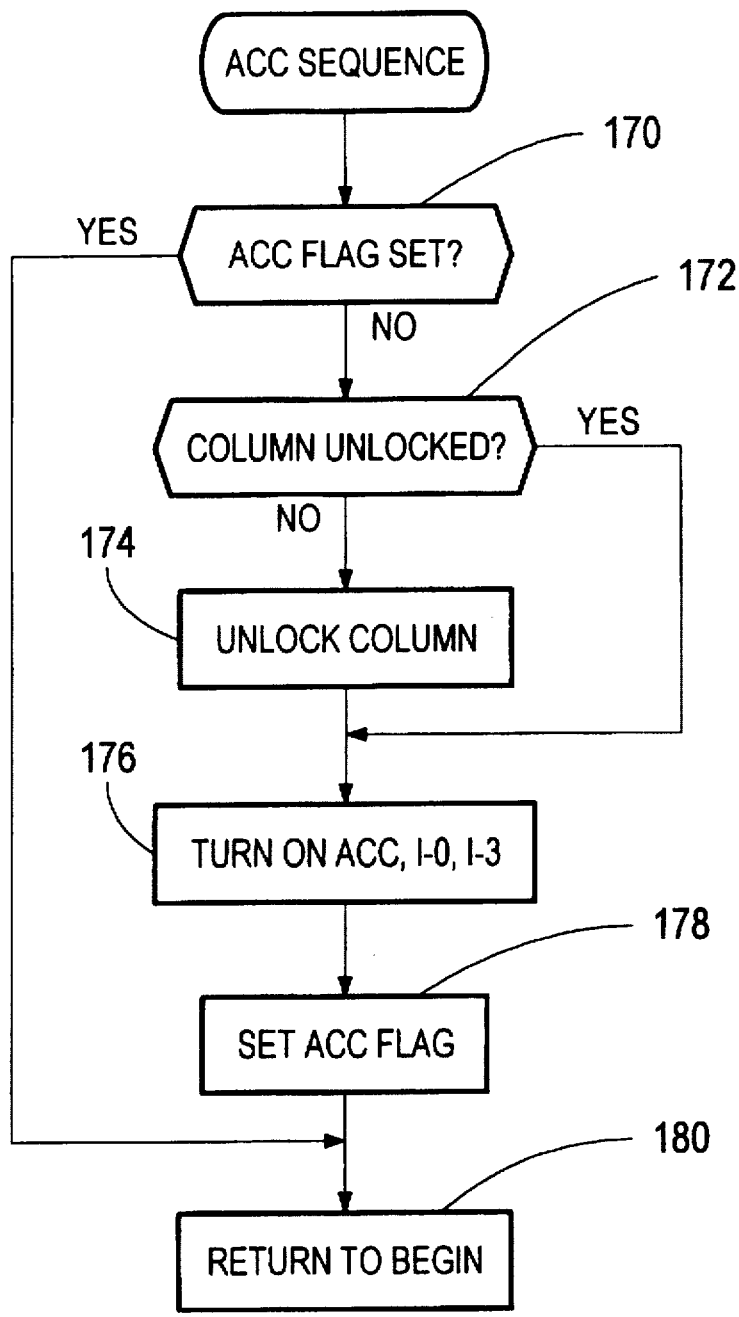

FIG. 5 shows the ACCESSORY sequence in flow chart form. This sequence is generally called when the vehicle operator has chosen accessory operation without engine operation by activating the ACC switch, since accessory power is automatically activated when the engine is started. An ACC flag is checked at 170; and, if it is set, the system proceeds directly to step 180, from which it returns to BEGIN. If it is not set, the ECL is checked at 172. If the column is not unlocked, the system proceeds to unlock it in a subroutine 174. If it is unlocked at 172, subroutine 174 is skipped. With the column unlocked, the ACC, I-0 and I-3 circuits are turned on at 176; and the ACC flag is then set at 178 before the system proceeds to step 180 for return to BEGIN. The I-0 circuit is turned on in order to activate the park lock solenoid so that the vehicle may be moved without engine starting, such as by pushing or towing.

Figure 6A:
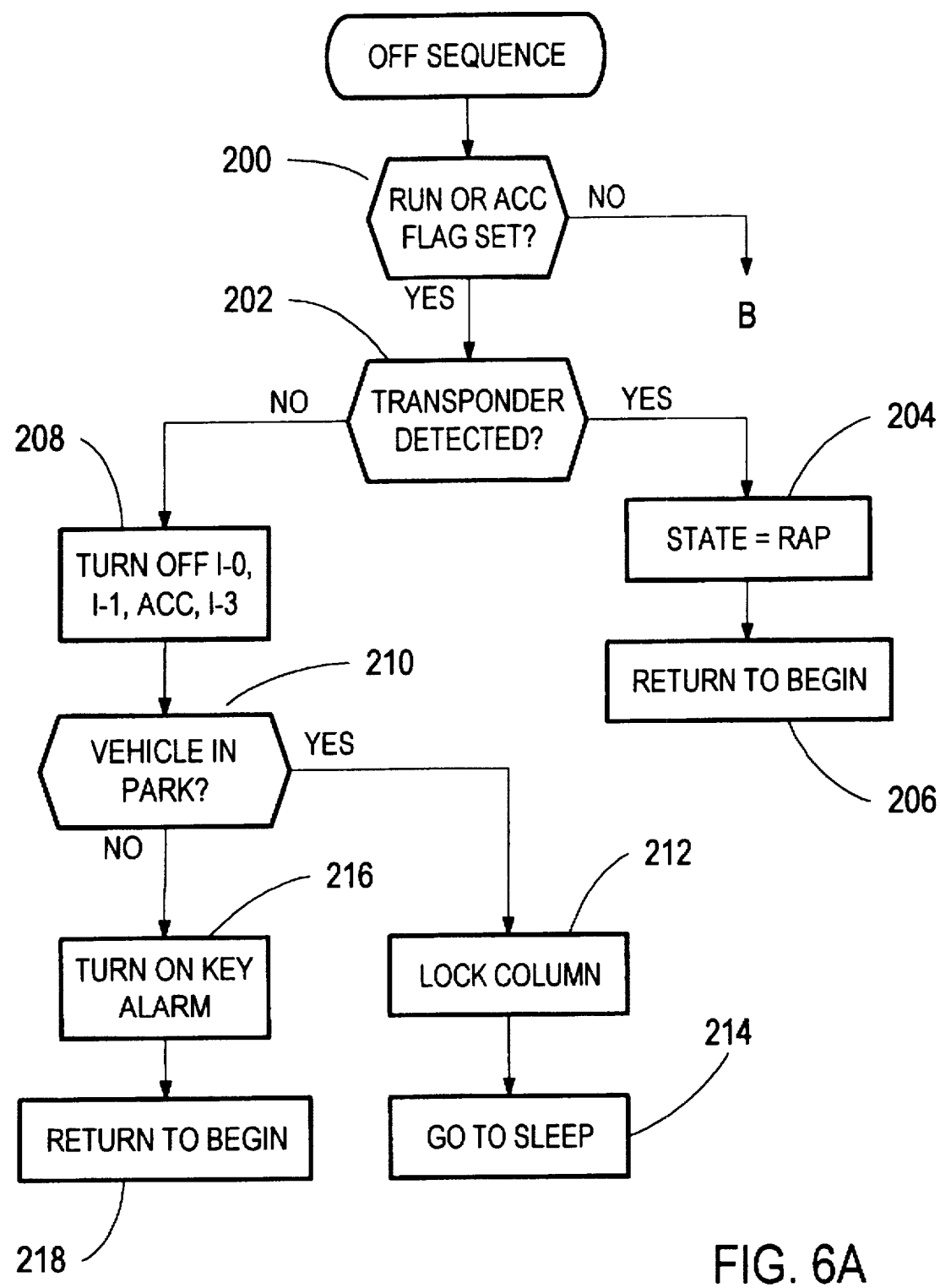
Figure 6B:
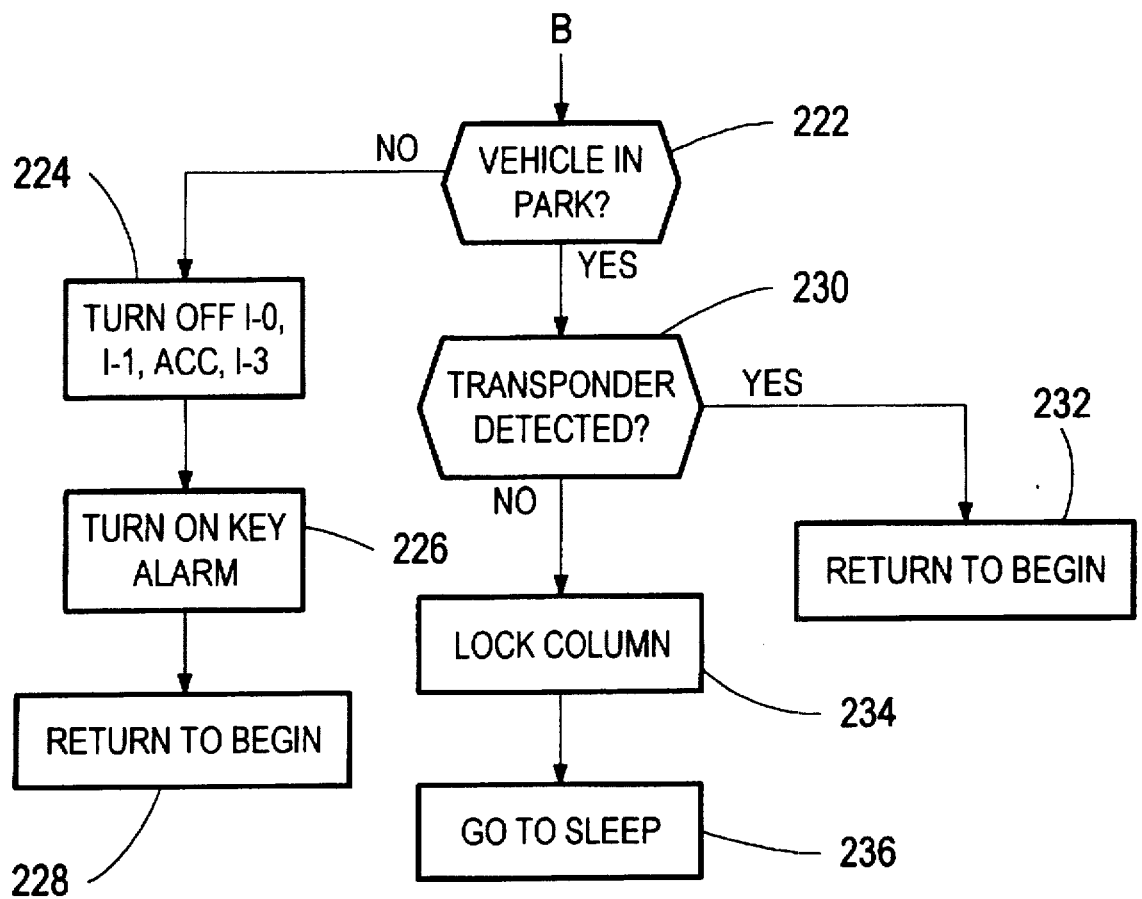

FIG. 6A and 6B show the OFF sequence in flow chart form. The OFF state is entered when the OFF switch is activated but also when a valid transmitter is first detected in the seating space before either of the RUN or ACC switches is activated. The system first checks at 200 to see if either of the RUN or ACC flags is set, which would indicate that the engine or accessories are or have been in use. If either is set, the system then checks at 202 to see if the transmitter is present. If so, the RAP state is selected at 204 before returning to BEGIN from 206. If the transmitter is not present, the system turns off the I-0, I-1, I-3 and ACC circuits at 208 and then determines at 210 if the vehicle transmission is in PARK by checking the status of the park switch 20. If so, the system locks the column at 212 before going to sleep at 214. When the system goes to sleep, the code datum that indicated presence of a valid transmitter is erased in the process and is thus removed from the system. If the vehicle transmission is not in PARK, the system turns on the key alarm at 216 before returning to BEGIN from 218. In this case, the code datum indicating the presence of the transmitter is not yet erased, since that would result in effective removal of the key from the system with the transmission out of PARK.

If neither of the RUN or ACC flags is set at 200, the system checks to see if the vehicle transmission is in PARK at 222 of FIG. 6B. If it is not, the system turns off the I-0, I-1, I-3 and ACC circuits at 224 and turns on the key alarm at 226 before returning to BEGIN from 228. If the vehicle transmission is in PARK at 222, however, the system checks for the presence of a valid transmitter in the seating space at 230. If the transmitter is present at 230, the system returns to BEGIN from 232; otherwise, the system locks the ECL at 234 and goes to sleep at 236. Once again, sleep mode resulting from step 236 results in the code datum being erased from system memory; but this only occurs in the OFF state, with no valid transmitter detected and with the vehicle transmission in PARK.

Figure 7:
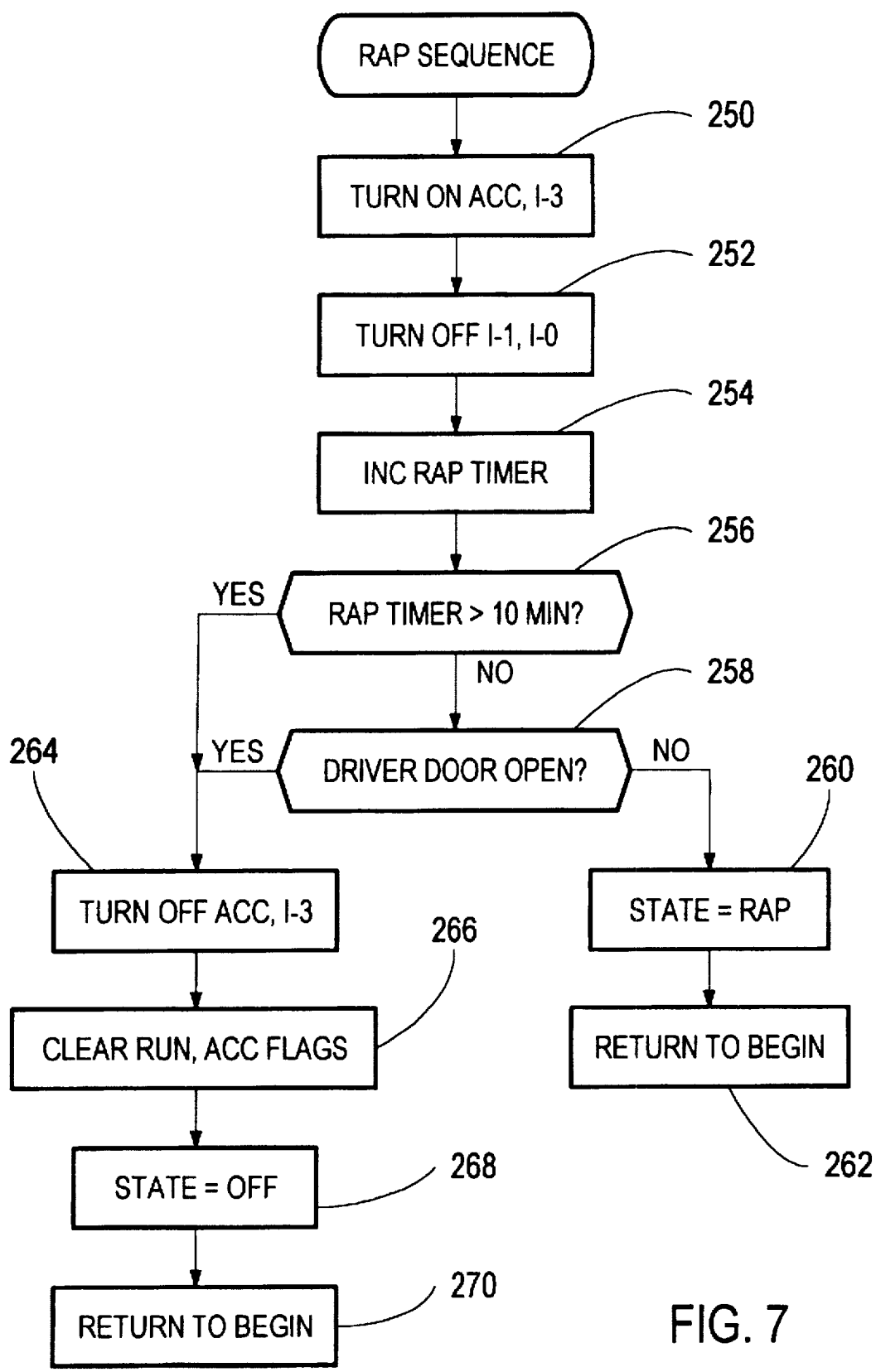

FIG. 7 shows the RAP sequence in flow chart form. RAP stands for Retain Accessory Power; and the RAP state is used to maintain power to the vehicle accessory circuits through terminals I-3 and ACC for a period of time or until the driver door is opened after cessation of the RUN or ACC states. The system activates the I-3 and ACC terminals at 250, deactivates the I-1 and I-0 circuits at 252 and increments a RAP timer at 254. The RAP timer is compared with a predetermined time such as ten minutes at 256; and, if the time is not exceeded, the system checks for an open driver door at 258. If the driver door is not open, the system selects the RAP state at 260 and returns to BEGIN from 262. This path leads to repeat of the RAP sequence and will continue until the RAP timer times out or the driver door opens, whichever occurs first. If the RAP timer has timed out at 256 or if the driver door is open at 258, the system deactivates the I-3 and ACC circuits at 264, clears the RUN and ACC flags at 266, and selects the OFF mode at 268 before returning to BEGIN from 270. This path returns the control to the OFF sequence for the management of control shutdown.

It has been described how, as the vehicle operator approaches the vehicle with the transmitter in a pocket or handbag, the driver door of the vehicle is unlocked and, when the operator carries the transmitter into the seating space of the vehicle, the transmitter is detected and validated and a code datum is stored in the memory of body computer 10. Alternatively, the transmitter validation could be performed at the time when the operator selects either RUN or ACC modes by activating the appropriate switch. In the embodiment described, the code datum is actually a code generated by RFA module 40 after it validates the transmitter code and passed by the RFA module to body computer 10, which stores it in memory. However, the code datum could be a simple flag in the memory of body computer 10 or the transmitter code itself, depending on the details of programming, as long as the code of the transmitter, after detection of the transmitter in the seating space of the vehicle, is validated and, as a result of that validation, the memory of body computer 10 is altered in a way to indicate that validation. This code datum corresponds to a physical key and is required for vehicle engine and/or accessory operation. In order to save battery life in the transmitter, the latter is not ordinarily checked continuously, although it is rechecked at certain events as specified in the preceding description. However, when engine and accessory use is discontinued, the transmitter is checked on a repeated basis to determine when it is removed from the vehicle seating space. While the transmitter is still present, the code datum is retained in memory; and vehicle use is thus still enabled. When the transmitter is removed, assuming that the vehicle is in a self-mobility preventing condition, such as PARK of an automatic transmission, the code datum is removed from memory as the system goes to sleep; and this corresponds to a physical key being removed from the vehicle.

I claim:

1. A motor vehicle comprising, in combination:

an engine;

an electric engine power circuit;

a start motor;

a vehicle body having a seating space therein associated with a driver seat;

detector means for detecting the presence of a valid radio frequency transmitter only within the seating space by receiving a coded radio frequency signal therefrom, deriving a code from the radio frequency signal and validating the derived code in a predetermined validation process;

a RUN signal generator;

a steering column lock;

an engine speed signal generator; and start control means responsive to activation of the RUN signal generator, provided that the detector means has detected the presence of a valid radio frequency transmitter within the seating space, to (1) unlock the steering column lock, (2) activate the engine electric power circuit and the start motor, (3) repeatedly receive an engine speed signal from the engine speed signal generator and compare the received engine speed signal to a predetermined speed reference indicating engine starting, (4) deactivate the start motor when the engine speed signal exceeds the speed reference or alternatively deactivate the engine electric power circuit and the start motor and lock the column lock if the engine speed signal does not exceed the speed reference within a first predetermined time.

2. The vehicle of claim 1 further comprising, in combination:

an accessory circuit;

a driver door;

an OFF signal generator;

engine deactivation means responsive to activation of the OFF signal generator during engine operation to deactivate the engine electric power circuit and activate the detector means;

accessory control means responsive to the engine deactivation means, if a valid transmitter is detected, to activate the accessory circuit for a predetermined time or until the driver door is opened, whichever occurs first, and suspend activation of the detector means for the duration of the activation of the accessory circuit.

3. The motor vehicle of claim 2 further comprising, in combination:

a vehicle driveline component having a condition wherein vehicle self-mobility is enabled and a condition wherein vehicle self-mobility is not enabled;

means for ending accessory circuit activation;

lock determination means responsive to the means for ending accessory circuit activation and the vehicle driveline component for activating a key alarm if vehicle self-mobility is enabled and repeatedly activating the detector means while vehicle self-mobility is not enabled; and means responsive to the lock determination means, when a valid transmitter is not detected in the vehicle seating space, to lock the column lock and prevent further activation of the electric engine power circuit and the accessory circuit.

4. The motor vehicle of claim 3 in which the engine driveline component is an automatic transmission having a PARK condition in which vehicle self-mobility is not enabled.

5. The motor vehicle of claim 1 further comprising, in combination:

a driver door;

a vehicle access control effective to detect the transmitter outside the vehicle body and provide vehicle access by receiving a coded radio frequency signal therefrom, deriving a code from the radio frequency signal, validating the derived code in a predetermined validation process and unlocking the driver door, the vehicle access control having a first antenna mounted on the vehicle body for communication with the transmitter outside the body and the detector means having a second antenna associated with the driver seat for communication with the transmitter only within the seating space.

6. The motor vehicle of claim 5 in which the second antenna is positioned under the driver seat.

7. The vehicle of claim 1 further comprising, in combination:

an automatic transmission having a PARK condition in which vehicle self-mobility is not enabled and another condition in which vehicle self-mobility is enabled;

park lock solenoid means for preventing a change in the automatic transmission from the PARK condition to the other condition when not activated but permitting such a change when activated;

means for deactivating the engine electric power circuit; and further means responsive to activation of the RUN signal generator for activating the park lock solenoid means when the engine speed signal exceeds the speed reference and for deactivating the park lock solenoid means along with the engine electric power circuit when the engine speed signal does not exceed the speed reference within the first predetermined time.

8. The vehicle of claim 1 further comprising, in combination:

a memory;

means for storing a code datum in the memory when the detector means detects the presence of a valid radio frequency transmitter only within the seating space, the code datum enabling activation of the engine electric power circuit and an accessory circuit;

means for activating the accessory circuit when the engine speed signal exceeds the speed reference;

a vehicle driveline component having a condition wherein vehicle self-mobility is enabled and a condition wherein vehicle self-mobility is not enabled; and means for deactivating the engine electric power circuit and the accessory circuit and repeatedly activating the detector means while retaining the code datum in the memory, the means further being responsive to the detector means, when a valid radio frequency transmitter is no longer detected within the seating space and the vehicle driveline component is in its condition wherein vehicle self-mobility is not enabled, to remove the code datum from the memory and thus prevent activation of the engine electric power circuit and the accessory circuit.

* * * * *